| (12) | United States Patent | (10) Patent No.: | US 9,254,542 B2 |
|---|---|---|---|
| | Yang et al. | (45) Date of Patent: | Feb. 9, 2016 |

(54) MACHINE TOOL WITH UNINTERRUPTED CUTTING

(71) Applicants: Ming-Lu Yang, New Taipei (TW); Tian-En Zhang, Shenzhen (CN); Ya-Dong Zhang, Shenzhen (CN); Jian-Shi Jia, Shenzhen (CN); Yang-Mao Peng, Shenzhen (CN); Wei-Chuan Zhang, Shenzhen (CN); Jing-Shuang Sui, Shenzhen (CN); Jian Qu, Shenzhen (CN); Feng-Hua Chen, Shenzhen (CN); Jian-Hua Jia, Shenzhen (CN); Xue Qin, Shenzhen (CN); Zhen-Zhou Tian, Shenzhen (CN); Bao-Peng Li, Shenzhen (CN); Jian-Min Yu, Shenzhen (CN)

(72) Inventors: Ming-Lu Yang, New Taipei (TW); Tian-En Zhang, Shenzhen (CN); Ya-Dong Zhang, Shenzhen (CN); Jian-Shi Jia, Shenzhen (CN); Yang-Mao Peng, Shenzhen (CN); Wei-Chuan Zhang, Shenzhen (CN); Jing-Shuang Sui, Shenzhen (CN); Jian Qu, Shenzhen (CN); Feng-Hua Chen, Shenzhen (CN); Jian-Hua Jia, Shenzhen (CN); Xue Qin, Shenzhen (CN); Zhen-Zhou Tian, Shenzhen (CN); Bao-Peng Li, Shenzhen (CN); Jian-Min Yu, Shenzhen (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 436 days.

(21) Appl. No.: 13/705,843

(22) Filed: Dec. 5, 2012

(65) Prior Publication Data

US 2014/0020527 A1    Jan. 23, 2014

(30) Foreign Application Priority Data

Jul. 20, 2012   (CN) .......................... 2012 1 0252858

(51) Int. Cl.
| *B23Q 5/34* | (2006.01) |
| *B23Q 1/01* | (2006.01) |
| *B23Q 1/62* | (2006.01) |
| *B23Q 5/28* | (2006.01) |

(52) U.S. Cl.
CPC   *B23Q 5/34* (2013.01); *B23Q 1/012* (2013.01); *B23Q 1/626* (2013.01); *B23Q 5/28* (2013.01); *Y10T 82/2511* (2015.01)

(58) Field of Classification Search
CPC .......... B23Q 1/01; B23Q 1/017; B23Q 1/012; B23Q 1/03; B23Q 1/25; B23Q 1/62; B23Q 5/28; B23Q 2701/01; B23B 5/40; B23C 1/06; Y10T 409/307112; Y10T 409/307056; Y10T 409/306776; Y10T 409/30756; Y10T 409/307728; Y10T 409/309576; Y10T 409/5041; Y10T 409/504756; Y10T 409/508036; Y10T 82/10; Y10T 82/13; Y10T 82/152
USPC ......... 409/191, 190, 185, 199, 202, 235, 313, 409/317, 337; 82/1.11, 18, 15
See application file for complete search history.

(56) References Cited

U.S. PATENT DOCUMENTS

| 2003/0034696 | A1 * | 2/2003 | Bundschu et al. .............. 310/12 |
| 2006/0052038 | A1 | 3/2006 | Klein |
| 2006/0270540 | A1 * | 11/2006 | Takayama et al. .............. 483/41 |

FOREIGN PATENT DOCUMENTS

| CN | 201186386 Y | 1/2009 |
| DE | 19650360 A1 | 5/1998 |

(Continued)

*Primary Examiner* — Sunil K Singh
*Assistant Examiner* — Alan Snyder
(74) *Attorney, Agent, or Firm* — Novak Druce Connolly Bove + Quigg LLP

(57) ABSTRACT

A machine tool includes a machine support, a work table positioned on the machine support, a moving device and a feeding device. The moving device is movably mounted on the machine support along a first direction above the work table. The feeding device is slidably positioned on the moving device along a second direction at ninety degrees from the first direction. The feeding device includes a feeding mechanism and a cutter. The feeding mechanism drives the tool holder and the cutter to move back and forth along a third orthogonal direction.

15 Claims, 5 Drawing Sheets

(56) References Cited

FOREIGN PATENT DOCUMENTS

| | | |
|---|---|---|
| DE | 102006024407 A1 | 12/2006 |
| JP | 2006326740 A | 12/2006 |
| TW | 553045 U | 9/2003 |
| TW | M286741 U | 2/2006 |
| WO | WO 2010105755 A1 * | 9/2010 |

\* cited by examiner

MACHINE TOOL WITH UNINTERRUPTED CUTTING

CROSS-REFERENCE TO RELATED APPLICATIONS

This application claims all benefits accruing under 35 U.S.C. §119 from China Patent Application No. 201210252858.8, filed on Jul. 20, 2012, in the China Intellectual Property Office, the disclosure of which is incorporated herein by reference. The application is also related to co-pending applications entitled, "FEEDING DEVICE AND MACHINE TOOL USING THE SAME" Ser. No. 13/705,788"METHOD FOR MACHINING CURVED SURFACE USING LATHE" Ser. No. 13/705,777; "LATHE FOR MACHINING CURVED SURFACES" Ser. No. 13/705,713; FEEDING DEVICE AND MACHINE TOOL USING THE SAME" Ser. No. 13/705,611; "LATHE WITH TWO CROSS BEAMS" Ser. No. 13/705,585; "LATHE CONTROL SYSTEM" Ser. No. 13/705,545; "WORKPIECE HAVING NON-ROTATARY SURFACE MACHINED BY LATHE" Ser. No. 13/705,478; "LATHE FOR MACHINING CURVED SURFACES" Ser. No. 13/705,383.

BACKGROUND

1. Technical Field

The present disclosure generally relates to machine tools, and particularly, to a machine tool which can continuously machine a curved surface.

2. Description of the Related Art

In the manufacturing field, a cutter of the machine tool is driven to move along X, Y, and Z axis directions by a feeding device of the machine tool, and also driven to rotate in high speed by a main shaft of the machine tool at the same time for machining a curved surface of a workpiece. However, after completing the machining of a first position of the workpiece, the feeding device needs to be driven to lift, and move a certain distance to a second position of the workpiece. This consumes more time, and the machining efficiency is decreased.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
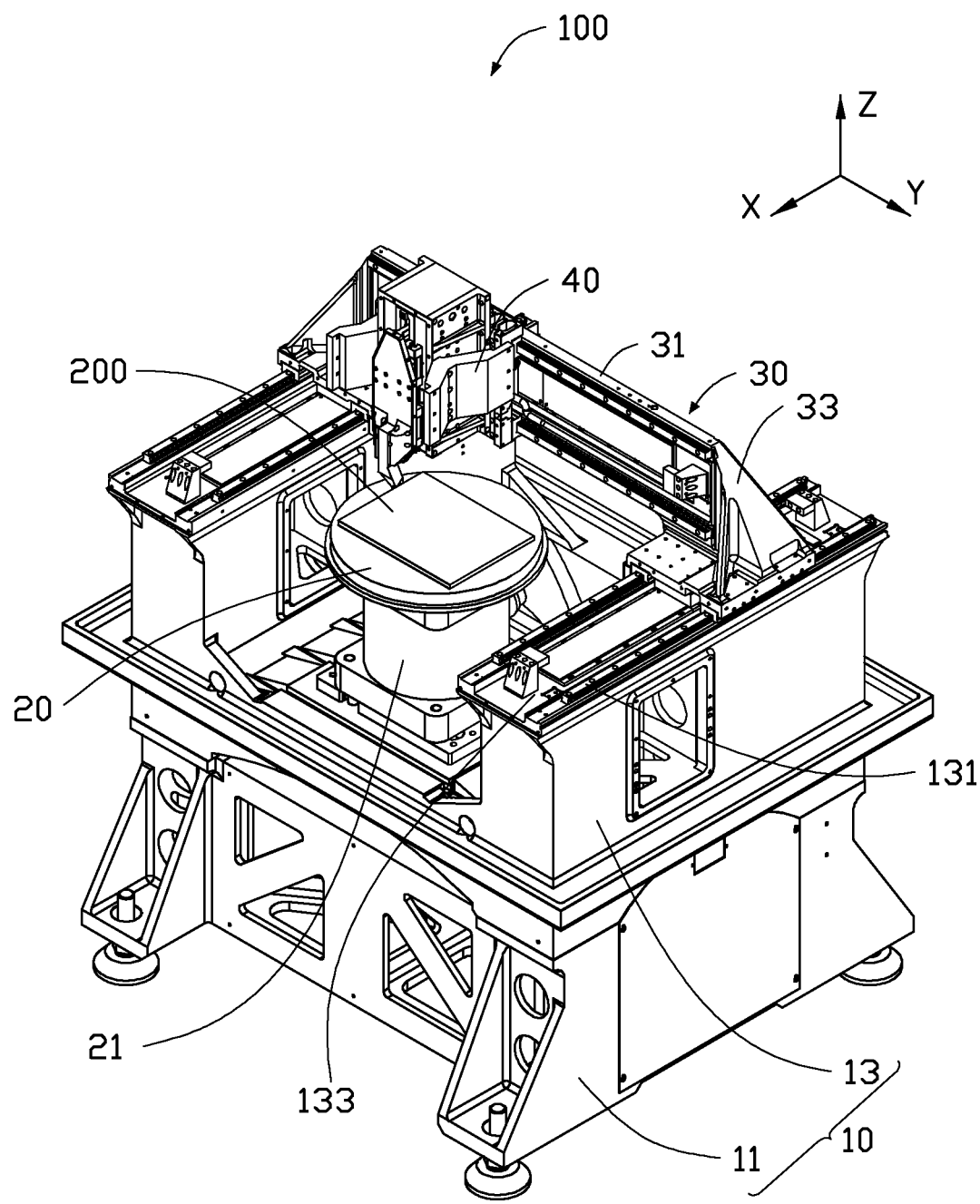
FIG. 1 is an isometric view of an embodiment of a machine tool having a feeding device.
Figure 2:
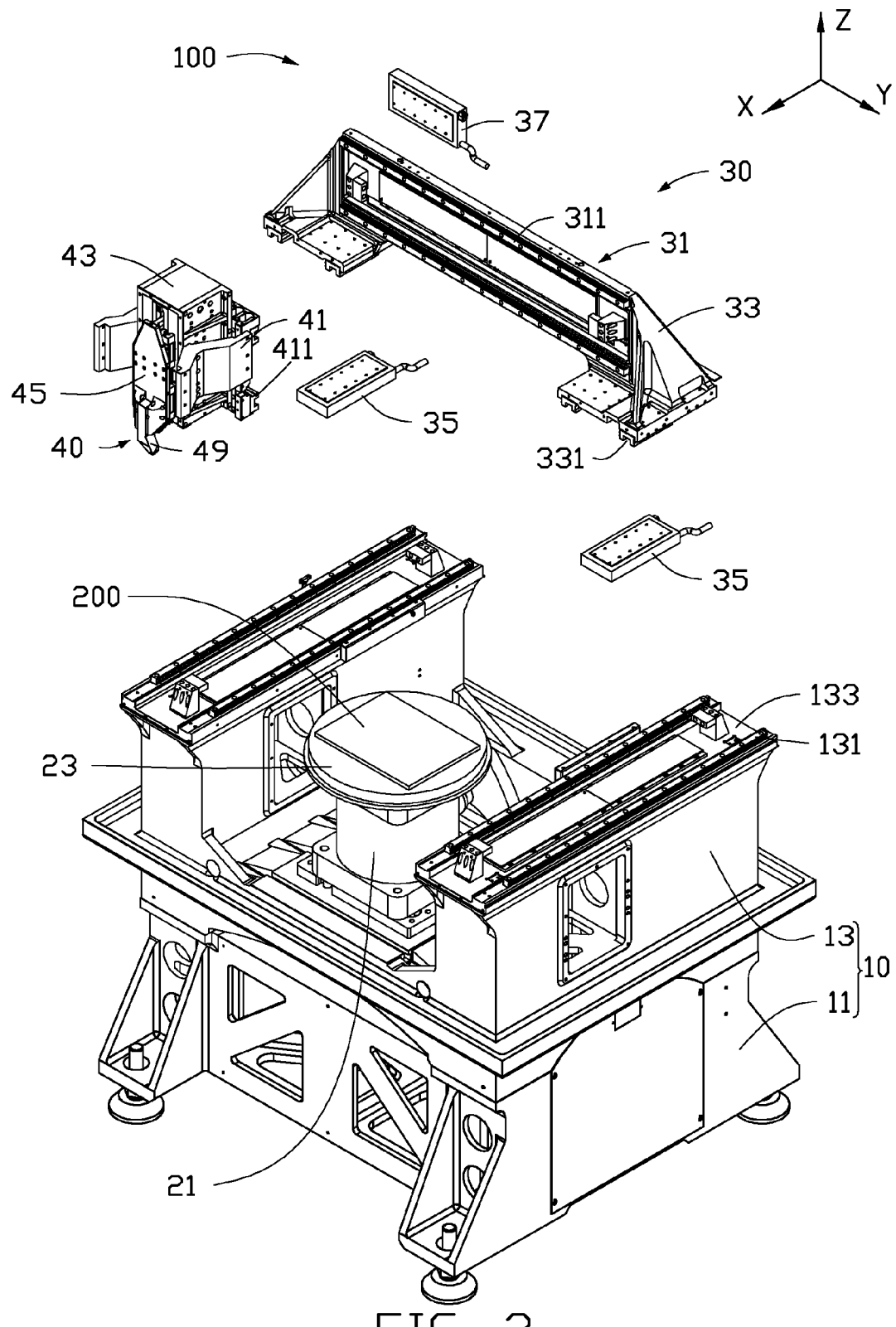
FIG. 2 is an exploded, isometric view of the machine tool of FIG. 1.

Referring to FIGS. 1 and 2, an embodiment of a machine tool 100 is shown. The machine tool 100 is used for machining a curved surface of a workpiece 200 in a single operation. The machine tool 100 includes a machine support 10, a work table 20, a moving device 30, a feeding device 40, and a controller (not shown). The work table 20 holds the workpiece 200 and is supported by the machine support 10. The moving device 30 is movably positioned on the machine support 10 above the work table 20. The feeding device 40 is slidably mounted on the moving device 30. The controller is electrically connected with the work table 20, the moving device 30 and the feeding device 40 for controlling the machine tool 100. Under the control of the controller, the moving device 30 can be driven to move with the feeding device 40, such that the feeding device 40 can be driven to move along the X, Y, and Z axes.

The machine support 10 includes a base 11 and a pair of support bodies 13 positioned parallel on the base 11. A pair of first sliding rails 131 are positioned parallel on a surface of each support body 13 away from the base 11, and are distanced from each other. In the illustrated embodiment, the first sliding rails 131 extend parallel to the X-axis. A receiving groove 133 is formed on each support body 13 between the two first sliding rails 131.

Referring also to FIG. 2, the work table 20 is substantially cylindrical, and rotatably positioned on the base 11 between the two support bodies 13. The work table 20 includes a rotating driver 21 and a support member 23 fixedly connected with the rotating driver 21 away from the base 11. The rotating driver 21 is electrically connected to the controller. In the illustrated embodiment, the rotating driver 21 is a direct drive motor.

The moving device 30 is mounted to the top surfaces of the pair of support bodies 13 above the work table 20, and can slide along the top surfaces of the pair of support bodies 13. The moving device 30 includes a cross beam 31, two sliding bases 33, two first driving mechanisms 35, and a second driving mechanism 37. Two ends of the cross beam 31 are slidably positioned on the support bodies 13 via the pair of the sliding bases 33. The extending direction of the cross beam 31 is parallel to the Y-axis. The pair of second sliding rails 311 are positioned on a side surface of the cross beam 31 adjacent to the work table 20 and extending parallel to the Y-axis. The two sliding bases 33 are installed on the opposite ends of the cross beam 31 to connect with and slide along the first sliding rails 131. Each first driving mechanism 35 is mounted on a surface of one sliding base 33 away from the cross beam 31 and received in the receiving groove 133. The first driving mechanisms 35 drive the cross beam 31 to move along the first sliding rails 131. The second driving mechanism 37 is mounted on the cross beam 31 to drive the feeding device 40 to move along the second sliding rails 311. The first driving mechanisms 35 and the second driving mechanism 37 are electrically connected to the controller. In the illustrated embodiment, the first driving mechanisms 35 and the second driving mechanism 37 are linear motors. In other embodiments, the first driving mechanisms 35 and the second driving mechanism 37 may be other drivers, such as hydraulic cylinders or rams; the number of the first driving mechanisms 35 and the second driving mechanism 37 may be designed according to their applications.

Figure 3:
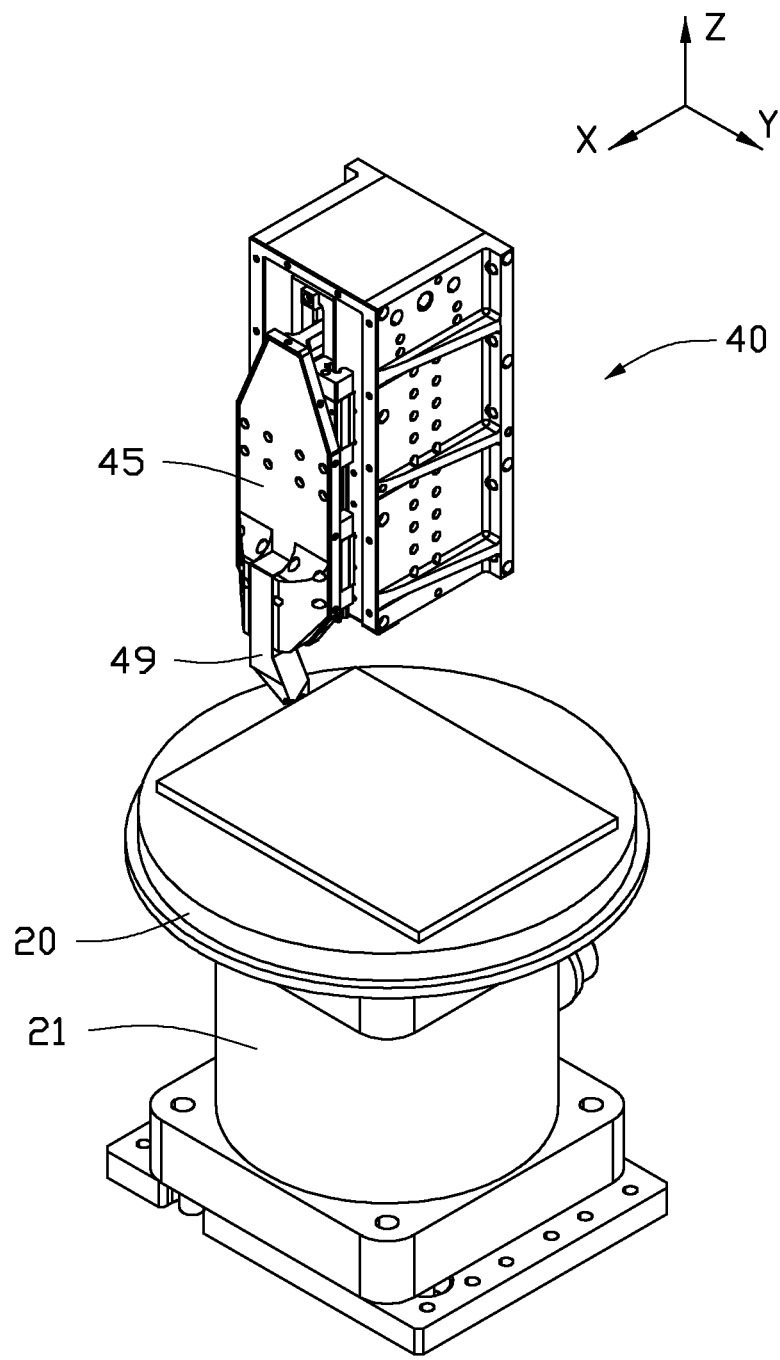
FIG. 3 shows an isometric view of the feeding device machining a workpiece.
Figure 4:
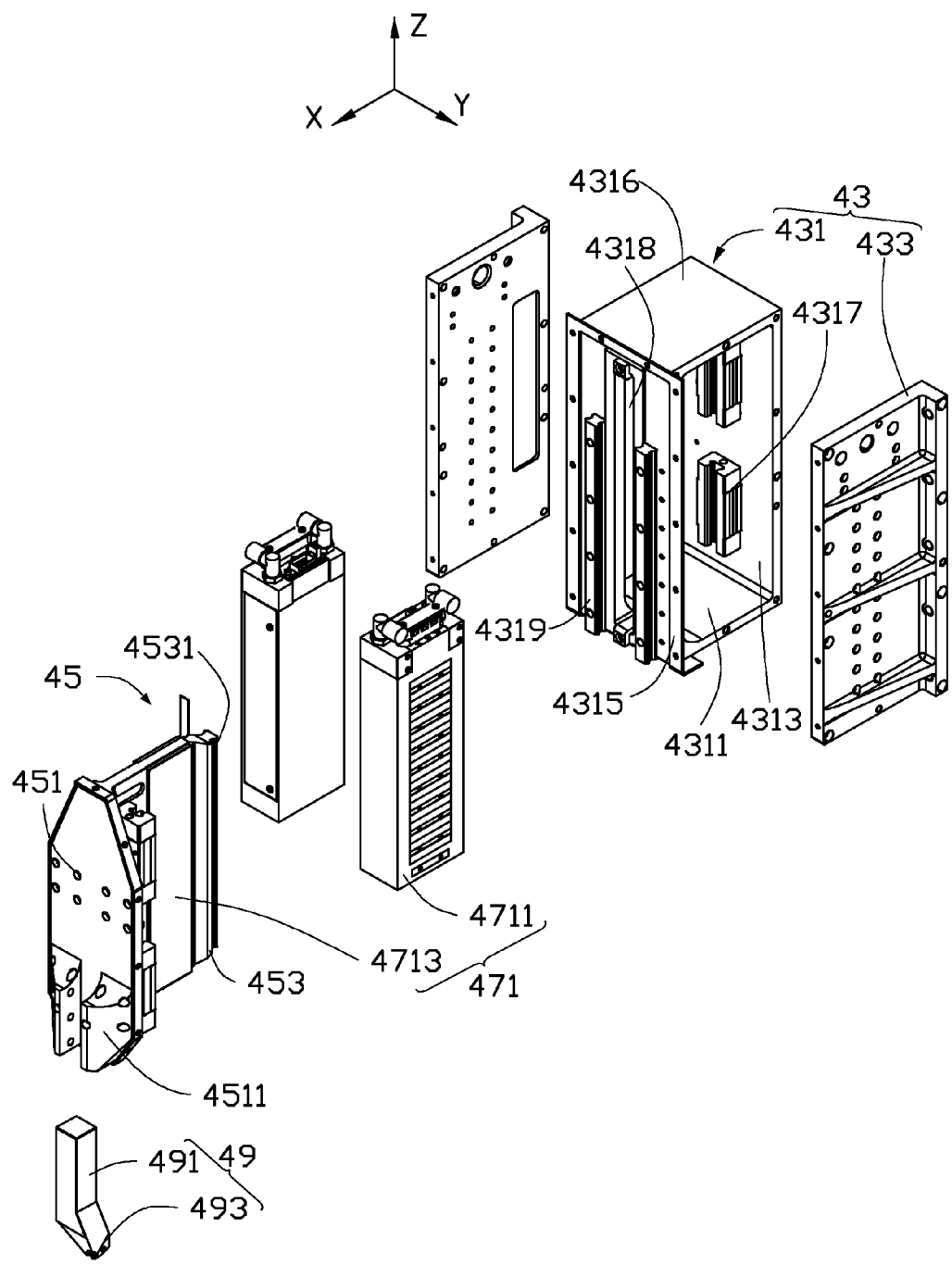
FIG. 4 is an exploded, isometric view of the feeding device of FIG. 3.
Figure 5:
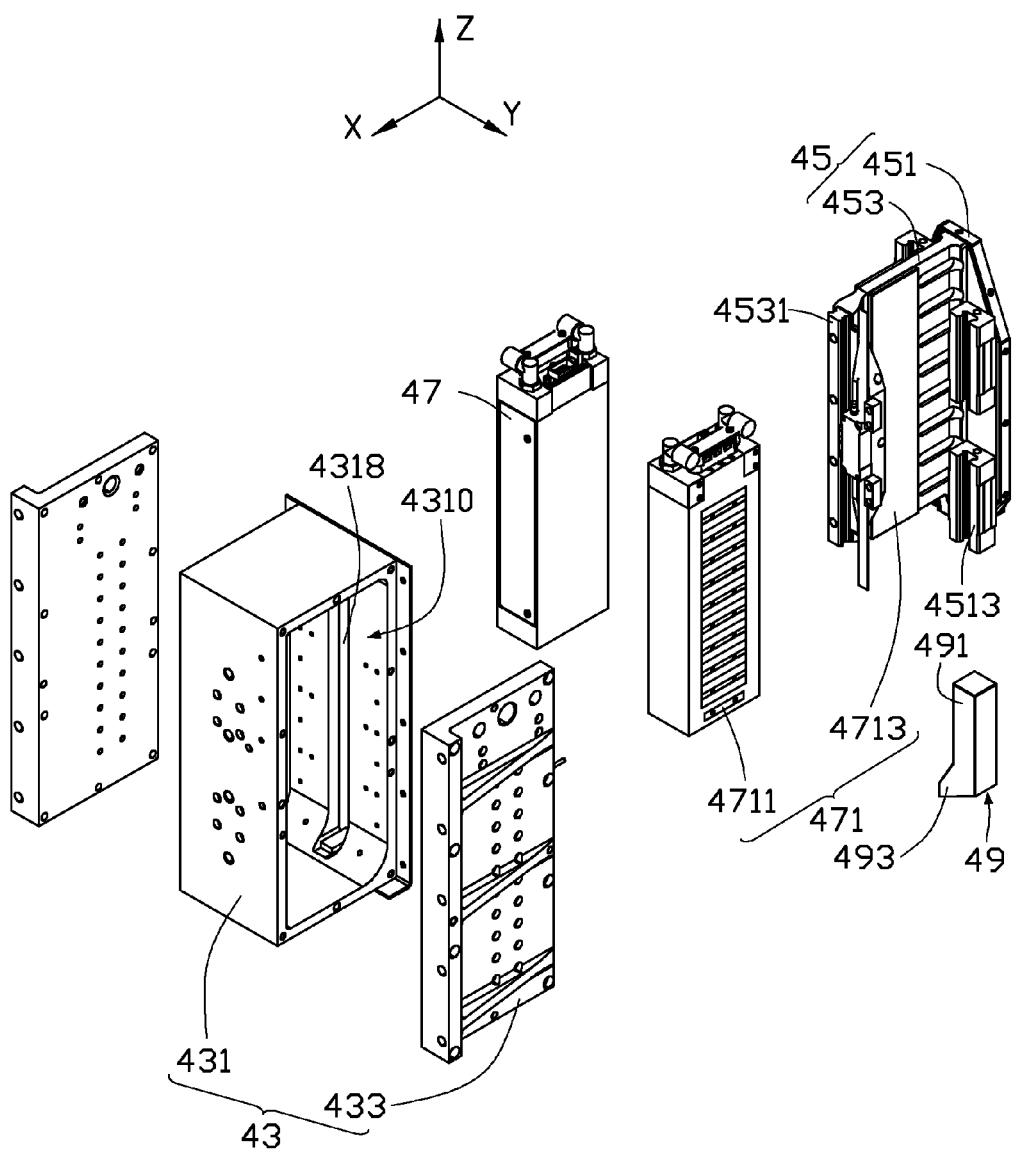
FIG. 5 is similar to FIG. 4, but viewed from another aspect.

Also referring to FIGS. 3 to 5, the feeding device 40 includes a sliding saddle 41, a mounting seat 43, a tool holder 45, two feeding mechanisms 47, and a cutting tool 49. The sliding saddle 41 is movably assembled with the cross beam 31. The mounting seat 43 is slidably connected with the sliding saddle 41 away from the cross beam 31. The feeding mechanisms 47 are mounted and received in the mounting seat 43, and electrically connected to the controller. The tool holder 45 is slidably positioned on the mounting seat 43, and has a reciprocating motion parallel to the Z-axis relative to the mounting seat 43.

Two sliding blocks 411 are separately positioned on a surface of the sliding saddle 41 away from the tool holder 45, and parallel to the Y-axis toward the cross beam 31. The sliding blocks 411 are slidably engaged with the second sliding rails 311.

The mounting seat 43 includes a frame 431, and two mounting boards 433. The frame 431 includes a bottom wall 4311, a first side wall 4313, a second side wall 4315, and a top wall 4316. The first side wall 4313 and the second side wall 4315 extend perpendicularly from the two ends of the bottom wall 4311 to connect with the top wall 4316, such that the bottom wall 4311, the first side wall 4313, the second side wall 4315, and the top wall 4316 cooperatively define a receiving space 4310. The bottom wall 4311 is positioned adjacent to the base 11. The first side wall 4313 is slidably connected with the sliding saddle 41. Two guiding portions 4317 protrude from an inner surface of the first side wall 4313 facing toward the second side wall 4315 and extend parallel to the Z-axis. A through groove 4318 is defined in the second side wall 4315 and extends along a direction parallel to the Z-axis. Two guiding portions 4319 protrude from an outer surface of the second side wall 4315 at two sides of the elongated through groove 4318. In the illustrated embodiment, the guiding portions 4319 are sliding rails, and the frame 431 is integrally formed. A mounting board 433 is installed on each of the two opening sides of the frame 431. Each mounting board 433 is perpendicularly connected with the bottom wall 4311, the first side wall 4313, the second side wall 4315 and the top wall 4316 for closing the frame 431.

The tool holder 45 slidably connects with the mounting seat 43. The tool holder 45 is substantially "T" shaped, and includes a main body 451 and a sliding board 453 protruding substantially perpendicularly from the main body 451. The main body 451 is a bar of material tapering in at both ends and positioned outside of the mounting seat 43. Two holding portions 4511 are positioned on a bottom of the main body 451 away from the sliding board 453. Four first direct portions 4513 (see FIG. 5) are positioned on a surface of the main body 451 adjacent to the sliding board 453. The four first direct portions 4513 are divided into two groups, each group having two first direct portions 4513 slidably engaged with one guiding portion 4319. The sliding board 453 is located between the two groups of the first direct portions 4513. The sliding board 453 passes through the through groove 4318 and is slidably attached to the two guiding portions 4317. A second direct portion 4531 is formed on an end of the sliding board 453 away from the main body 451, and received in the guiding portion 4317. In the illustrated embodiment, the first direct portions 4531 are sliding blocks, the second direct portion 4531 is a sliding rail.

The feeding mechanism 47 is mounted in the mounting seat 43, and includes two drivers 471. In the illustrated embodiment, the drivers 471 are linear motors. Each driver 471 includes a forcer 4711 and a stator 4713. Each forcer 4711 is fixed to a surface of the mounting board 433 facing receiving space 4310, and is received in the receiving space 4310. The sliding board 453 is positioned between the two forcers 4711. The forcers 4711 produce alternating magnetic fields when the forcers 4711 are supplied with an alternating electrical current. Two stators 4713 are fixedly positioned on the opposite surfaces of the sliding board 453. Each stator 4713 is located between one forcer 4711 and the sliding board 453. Interactions between magnetic fields produced by the stators 4713 and the alternating magnetic fields which are produced by the forcers 4711 drive the tool holder 45 into a reciprocating motion at high speed along the direction of the Z-axis. In other embodiments, the number of drivers 471 may be designed according to the real application. For example, the two drivers 471 can take the place of a single driver with more power, or three or more drivers can be positioned to drive the tool holder 45 to maximize the available power, and assembly of the drivers is simpler.

The cutter 49 is fixedly clamped between the two holding portions 4511 for machining curved surfaces of the workpiece 200. The cutter 49 includes a shank 491 and a cutter body 493 connected with the shank 491. The shank 491 is fixedly located between the two holding portions 4511. The cutter body 493 is positioned adjacent to the base 11. In the illustrated embodiment, the cutter 49 is a lathe tool.

In other embodiments, the mounting seat 43 may be fixedly positioned on the sliding saddle 41 when the machine tool 100 machines a single type of workpiece 200. In other words, the mounting seat 43 may be fixed in place when movement along the Z-axis direction is not required. A driving mechanism electrically connected to the controller may be positioned in the feeding device 40 to drive the mounting seat 43 to slide along the sliding saddle 41 in the Z-axis. The sliding saddle 41 may be omitted, and the mounting seat 43 can be directly slidably positioned on the cross beam 31.

In other embodiments, the forcers 4711 may be directly installed on the frame 431. The alternating magnetic fields produced by the forcers 4711 drive the stators 4713, thereby causing the tool holder 45 to undergo a reciprocating motion at high speed along the guiding portions 4317.

In assembly, the work table 20 is positioned between the two support bodies 13. The cross beam 31 is installed on the two support bodies 13. The first driving mechanism 35 and the second mechanism 37 are mounted on the cross beam 31. The sliding saddle 41 is also positioned on the cross beam 31. The two stators 4713 are fixedly mounted on two surfaces of the sliding board 453. The sliding board 453 passes through the through groove 4318 and slidably connects with the second direct portion 4531. Each forcer 4711 is installed on one mounting board 433 and received in the mounting seat 43 together with the mounting board 433. The cutter 49 is fixedly mounted between the two holding portions 4511. Finally, the feeding device 40 is positioned on the sliding saddle 41 and electrically connected to the controller.

In use, the workpiece 200 is placed on the work table 20. The first driving mechanism 35 drives the moving device 30 to move along the first sliding rails 131 in the X-axis direction, the driving mechanism 37 drives the moving device 30 to move along the second sliding rails in the Y-axis direction, and the mounting seat 43 slides back and forth on the sliding saddle 41 in the Z-axis direction, under the control of the controller. The feeding device 40 arrives at a preset position for machining. The first driving mechanism 35 drives the moving device 30 to move along the first sliding rails 131 in the X-axis direction, the rotating driver 21 rotates the workpiece, and the cutter 49 reciprocates at high speed in the Z-axis direction by the drivers 471, for continuously machining the workpiece 200. The rotating speed of the rotating driver 21, and the speed and the amplitude of the cutter 49 are programmed according to the depth of cutting required for each machining portion of the workpiece 200. The planar machining path of the cutter 49 is substantially spiral. The feeding device 40 and the work table 20 stop moving after the machining is finished, and the moving device 30 returns to the initial position. The workpiece 200 can then be unloaded from the work table 20.

The interaction between the alternating magnetic fields produced by the forcers 4711 and the magnetic fields produced by the stators 4713, drives the tool holder 45 and the cutter 49 to reciprocate at high speed along the guiding portion 4317 in the Z-axis direction for machining a curved surface onto the workpiece 200. The cutter 49 is in constant contact with the workpiece 200 and continuously machining at high speed. The feeding device 40 does not need to move during the machining. Much time is saved compared with the typical feeding device, and better machining efficiency is achieved. A milling cutter with different cutting edges is typically used for machining a curved surface. Some tracks or lines will remain on the milled surface of the workpiece because of interrupted and intermittent milling by the milling cutter. A polishing process would need to be performed to the workpiece for a better appearance. However, no other process needs to be added to the workpiece 200 which is machined by the machine tool 100 because the cutter 49 is continuously machining.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A machine tool, comprising:
    a machine support;
    a work table positioned on the machine support;
    a moving device movably mounted on the machine support along a first direction above the work table; and
    a feeding device slidably positioned on the moving device along a second direction at ninety degrees from the first direction, the feeding device comprising a feeding mechanism and a cutter,
    wherein the feeding mechanism drives the cutter to move back and forth along a third direction at high speed for continuously machining, the third direction is perpendicular to the first and second direction, the feeding device further comprises a sliding saddle and a mounting seat, the sliding saddle is slidably positioned on the moving device along the second direction, the mounting seat is slidably connected with the sliding saddle for moving along the third direction, and the feeding mechanism and the cutter are mounted on the mounting seat, the feeding device further comprises a tool holder, at least one guiding portion is positioned on the mounting seat along the third direction, the tool holder is slidably connected with the at least one guiding portion, and the cutter is mounted on the mounting seat via the tool holder, the tool holder comprises a main body and a sliding board protruding from the main body, the sliding board extends into the mounting seat and slidably connects with the at least one guiding portion, and the main body is positioned outside of the mounting seat and fixedly connects with the cutter, the feeding mechanism comprises at least one driver, the at least one driver comprises at least one forcer and at least one stator, the at least one forcer is mounted in the mounting seat, the at least one stator is fixedly positioned on the sliding board, alternating magnetic fields produced by the at least one forcer interact with the magnetic fields produced by the at least one stator.

2. The machine tool of claim 1, wherein the mounting seat comprises a frame defining two opening sides, and two mounting boards mounted on the two opening sides of the frame to close the frame, the at least one guiding portion is positioned on an inner surface of the frame, and the at least one forcer is mounted on one of the two mounting boards and received in the frame.

3. The machine tool of claim 2, wherein the frame comprises a bottom wall, a first side wall, a second side wall, and a top wall, the first side wall and the second side wall extend from two ends of the bottom wall, the top wall is connected with the first side wall and the second side wall and positioned away from the bottom wall, the at least one guiding portion is formed on a surface of the first side wall facing the first side wall, and the bottom wall, the first side wall, the second side wall, and the top wall cooperatively form the frame defining the two opening sides.

4. The machine tool of claim 3, wherein a through groove is defined though the second side wall, and the sliding board passes through the through groove.

5. The machine tool of claim 1, wherein the mounting seat comprises a mounting seat body and at least one guiding portion protruding from a side surface of the mounting seat body facing the main body, and the main body comprises at least one first direct portion slidably engaged with at least one guiding portion.

6. The machine tool of claim 1, wherein the sliding board comprises a second direct portion, and the second direct portion is positioned on the end of the sliding board away from the main body and slidably connected with the at least one guiding portion.

7. The machine tool of claim 1, wherein the moving device comprises a cross beam and at least one first driving mechanism, the cross beam is slidably connected with the machine support in the second direction and above the work table, and the at least one first driving mechanism drives the cross beam to move on the machine support along the first direction.

8. The machine tool of claim 7, wherein the machine support comprises a base and two support bodies, the two support bodies are positioned parallel and apart on the base along a first direction, the cross beam is slidably connected with the two support bodies, and the at least one first driving mechanism drives the cross beam to move along the support bodies.

9. The machine tool of claim 7, wherein the moving device further comprises at least one second mechanism, and the second mechanism is mounted on the cross beam for driving the feeding device to move along the cross beam.

10. The machine tool, of claim 7, wherein the cutter is a lathe tool.

11. A machine tool, comprising:
    a machine support;
    a work table positioned on the machine support;
    a moving device movably slidably mounted on the machine support along a first direction above the work table; and
    a feeding device comprising a tool holder, a feeding mechanism, a cutter positioned on the tool holder, and a mounting seat positioned on the moving device along a second direction, wherein the mounting seat comprises a mounting seat body and at least one guiding portion positioned in a side surface of the mounting seat body along a third orthogonal direction, the tool holder comprises a main body and a sliding board protruding from the main body, the sliding board extends into the mounting seat body and slidably connects with the at least one guiding portion, the main body is positioned outside of the mounting seat and fixedly connects with the cutter, at least one first direct portion is formed in the main body and slidably engaged with the mounting seat, the feeding mechanism drives the tool holder and the cutter to move back and forth along the at least one guiding portion at high speed for continuously machining, the second direction is perpendicular to the first direction, and the third direction is perpendicular to the first and second direction, the feeding mechanism comprises at least one driver, the at least one driver comprises at least one forcer and at least one stator, the at least one forcer is mounted in the mounting seat, the at least one stator is fixedly positioned on the sliding board, and alternating magnetic fields produced by the at least one forcer interact with the magnetic fields produced by the at least one stator.

12. The machine tool of claim 11, wherein the moving device comprises a cross beam and at least one first driving mechanism, the cross beam is slidably connected with the machine support in the second direction above the work table, the at least one first driving mechanism drives the cross beam to move on the machine support along the first direction.

13. The machine tool of claim 12, wherein the machine support comprises a base and two support bodies, the two support bodies are positioned parallel and apart on the base along a first direction, the cross beam is slidably connected with the two support bodies, and the at least one first driving mechanism drives the cross beam to move along the support bodies.

14. The machine tool of claim 12, wherein the moving device further comprises at least one second driving mechanism, and the at least one second driving mechanism is mounted on the cross beam for driving the feeding device to move along the cross beam.

15. A machine tool, comprising:
a machine support;
a work table positioned on the machine support;
a moving device movably mounted on the machine support along a first direction above the work table; and
a feeding device slidably positioned on the moving device along a second direction at ninety degrees from the first direction, the feeding device comprising a feeding mechanism and a cutter,
wherein the feeding mechanism drives the cutter to move back and forth along a third direction, the third direction is perpendicular to the first and second direction, the feeding device further comprises a mounting seat and a tool holder, the mounting seat is positioned on the moving device along a second direction, the tool holder is slidably connected to the mounting seat, the cutter is fixedly hold in the tool holder, the feeding mechanism comprises at least one driver, the at least one driver comprises at least one forcer and at least one stator, the at least one forcer is mounted in the mounting seat, the at least one stator is fixedly positioned on the tool holder, alternating magnetic fields produced by the at least one forcer interact with the magnetic fields produced by the at least one stator.

* * * * *